(12) United States Patent
Chang et al.

(10) Patent No.: US 11,080,295 B2
(45) Date of Patent: Aug. 3, 2021

(54) COLLECTING, ORGANIZING, AND SEARCHING KNOWLEDGE ABOUT A DATASET

(71) Applicant: Adobe Inc., San Jose, CA (US)

(72) Inventors: Walter Chang, San Jose, CA (US); Nicholas Digiuseppe, Irvine, CA (US)

(73) Assignee: Adobe Inc., San Jose, CA (US)

( * ) Notice: Subject to any disclaimer, the term of this patent is extended or adjusted under 35 U.S.C. 154(b) by 1011 days.

(21) Appl. No.: 14/538,393

(22) Filed: Nov. 11, 2014

(65) Prior Publication Data

US 2016/0132572 A1 May 12, 2016

(51) Int. Cl.
*G06F 16/25* (2019.01)
*G06F 16/11* (2019.01)
(Continued)

(52) U.S. Cl.
CPC .......... *G06F 16/258* (2019.01); *G06F 16/116* (2019.01); *G06F 16/243* (2019.01);
(Continued)

(58) Field of Classification Search
CPC .......... G06F 17/30569; G06F 17/2785; G06F 17/30076; G06F 17/30401; G06F 17/3053; G06F 17/30684; G06F 17/30958; G06F 17/30976; G06F 16/258; G06F 16/116; G06F 16/3344; G06F 16/24578; G06F 16/90332; G06F 16/243; G06F 16/9024; G06F 40/30
USPC ... 707/723, 769, 999.003, 999.004, 999.005, 707/E17.008, E17.058, E17.071, E17.078, 707/23
See application file for complete search history.

(56) References Cited

U.S. PATENT DOCUMENTS 6,263,335 B1 * 7/2001 Paik .................. G06F 17/30707
8,037,108 B1 * 10/2011 Chang .................. G06F 17/303
707/803

(Continued)

OTHER PUBLICATIONS

Paik et al, "Semantic Words Similarity in Triple Relation Using Intermediate Concept by PLSI", 2010 IEEE International Conference on Systems Man and Cybernetics (SMC), Oct. 10-13, 2010, pp. 912-917.*

*Primary Examiner* — Tony Mahmoudi
*Assistant Examiner* — Kamal K Dewan
(74) *Attorney, Agent, or Firm* — Kilpatrick Townsend & Stockton LLP

(57) ABSTRACT

Techniques for organizing knowledge about a dataset storing data from or about multiple sources may be provided. For example, the data can be accessed from the multiple sources and categorized based on the data type. For each data type, a triple extraction technique specific to that data type may be invoked. One set of techniques can allow the extraction of triples from the data based on natural language-based rules. Another set of techniques can allow a similar extraction based on logical or structural-based rules. A triple may store a relationship between elements of the data. The extracted triples can be stored with corresponding identifiers in a list. Further, dictionaries storing associations between elements of the data and the triples can be updated. The list and the dictionaries can be used to return triples in response to a query that specifies one or more elements.

20 Claims, 10 Drawing Sheets

(51) Int. Cl.
*G06F 16/33* (2019.01)
*G06F 16/2457* (2019.01)
*G06F 16/9032* (2019.01)
*G06F 16/242* (2019.01)
*G06F 16/901* (2019.01)
*G06F 40/30* (2020.01)

(52) U.S. Cl.
CPC .... *G06F 16/24578* (2019.01); *G06F 16/3344* (2019.01); *G06F 16/9024* (2019.01); *G06F 16/90332* (2019.01); *G06F 40/30* (2020.01)

(56) References Cited

U.S. PATENT DOCUMENTS

| | | | | |
|---|---|---|---|---|
| 2006/0053172 | A1* | 3/2006 | Gardner | G06N 5/02 |
| 2007/0233656 | A1* | 10/2007 | Bunescu | G06F 17/278 |
| 2008/0301094 | A1* | 12/2008 | Zhu | G06F 17/30716 |
| 2009/0192954 | A1* | 7/2009 | Katukuri | G06F 17/3061 706/11 |
| 2011/0307435 | A1* | 12/2011 | Overell | G06F 17/278 706/46 |
| 2011/0320491 | A1* | 12/2011 | Jung | G06N 5/022 707/776 |
| 2013/0262449 | A1* | 10/2013 | Arroyo | G06F 17/30442 707/722 |
| 2014/0237000 | A1* | 8/2014 | Lorge | G06F 17/30734 707/794 |
| 2014/0379755 | A1* | 12/2014 | Kuriakose | G06F 17/3043 707/780 |
| 2015/0339577 | A1* | 11/2015 | Waltinger | G06N 5/04 706/12 |
| 2015/0363384 | A1* | 12/2015 | Williams | G06F 17/2785 704/9 |
| 2015/0378984 | A1* | 12/2015 | Ateya | G06F 17/30684 707/769 |
| 2017/0351745 | A1* | 12/2017 | Guo | G06F 17/30589 |

\* cited by examiner

802: People look at websites. A website is a set of webpages. It is in the form of text and images. Web pages are connected by links. Clicking on a link makes another webpage appear. Webpages are hosted on web servers and downloaded and viewed with a web browser. Web pages are sent to the browser in HTML code. The writer of the page can write HTML directly, or use a computer program to convert other writing to HTML.

| Exp# | Type | Sent 0001 Word POS-Tags |
|---|---|---|
| 01 | NX | People/NNS |
| 02 | VX | look/VBP |
| 03 | IN | at/IN |
| 04 | NX | website/NNS |
| 05 | P. | /. |
| Exp# | Type | Sent 0002 Word POS-Tags |
| 01 | NX | A/DT website/NN |
| 02 | VX | is/VBZ |
| 03 | NX | a/DT set/NN |
| 04 | IN | of/IN |
| 05 | NX | webpages/NN |
| 06 | P. | /. |

804

806:
(People, Look at, website)
(A website, is a, set of webpages)

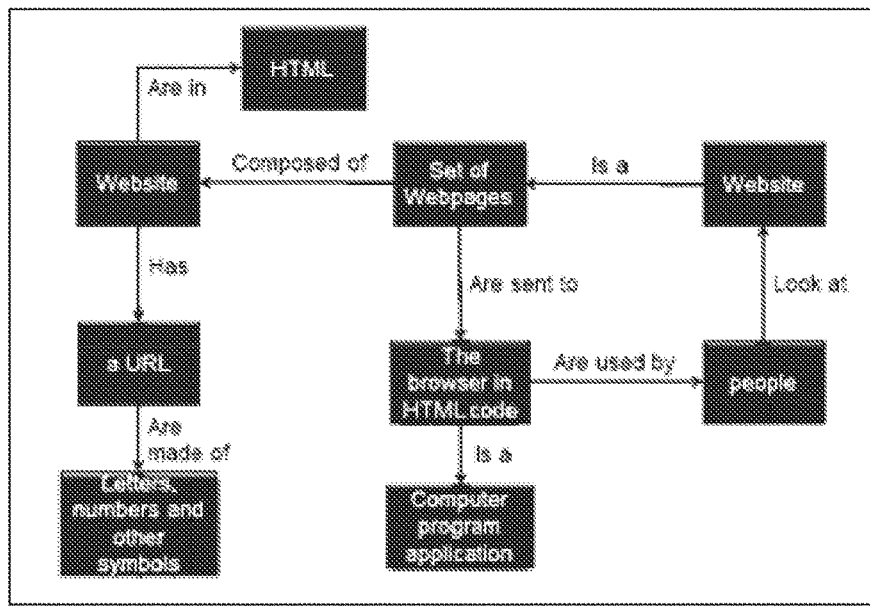

| Ethnicity | Population | Percentage of U.S. Population |
|---|---|---|
| White | 223,553,265 | 72.4% |
| African American | 38,929,319 | 12.6% |
| Asian American | 14,674,252 | 4.8% |
| Native Americans or Alaska Native | 2,932,248 | 0.9% |
| Some other Race | 19,107,368 | 9.3% |

— 902

(White, Population, 223,553,265)
(White, Percentage of U.S. Population, 72.4%)
(African American, Percentage of U.S. Population, 12.6%)
(Asian American, Percentage of U.S. Population, 4.8%)
(Native American, Percentage of U.S. Population, 0.9%)
(Some Other Race, Percentage of U.S. Population, 9.3%)

— 904

(White, is an, ethnicity)
(African American, is an, ethnicity)
(Asian American, is an, ethnicity)
(Native American, is an, ethnicity)
(Some Other Race, is an, ethnicity)

| table_name | column_name | column_comment |
|---|---|---|
| qt_r00001 | AREA_NAME | Name of zip code area |
| qt_r00001 | ztype | zip code type |
| qt_r00001 | CODE | Name of zip code area. # JOINKEY (qt_r00000[ZipCode],qt_r00002[CODE], qt_r00004[CODE],QT_R00005[CODE],qt |
| qt_r00001 | XCOORD | x coordinate of zip code |
| qt_r00001 | YCOORD | y coordinate of zip code |
| qt_r00001 | R001001 | Five Year Projected Total Population |
| qt_r00001 | R013A01 | Median Age |
| qt_r00001 | R013B01 | Average Age |
| qt_r00001 | R012002 | Five Year Projected Male Population |
| qt_r00001 | R012003 | Five Year Projected Male Population: Age 0 to 4 |
| qt_r00001 | R012004 | Five Year Projected Male Population: Age 5 to 14 |
| qt_r00001 | R012006 | Five Year Projected Male Population: Age 14 to 18 |
| qt_r00001 | R012007 | Five Year Projected Male Population: Age 18 to 22 |
| qt_r00001 | R012009 | Five Year Projected Male Population: Age 22 to 25 |
| qt_r00001 | R012011 | Five Year Projected Male Population: Age 25 to 30 |
| qt_r00001 | R012012 | Five Year Projected Male Population: Age 30 to 35 |
| qt_r00001 | R012013 | Five Year Projected Male Population: Age 35 to 40 |
| qt_r00001 | R012014 | Five Year Projected Male Population: Age 40 to 45 |
| qt_r00001 | R012015 | Five Year Projected Male Population: Age 45 to 50 |
| qt_r00001 | R012016 | Five Year Projected Male Population: Age 50 to 55 |
| qt_r00001 | R012017 | Five Year Projected Male Population: Age 55 to 60 |
| qt_r00001 | R012018 | Five Year Projected Male Population: Age 60 to 65 |
| qt_r00001 | R012020 | Five Year Projected Male Population: Age 65 to 70 |
| qt_r00001 | R012022 | Five Year Projected Male Population: Age 70 to 75 |
| qt_r00001 | R012023 | Five Year Projected Male Population: Age 75 to 80 |

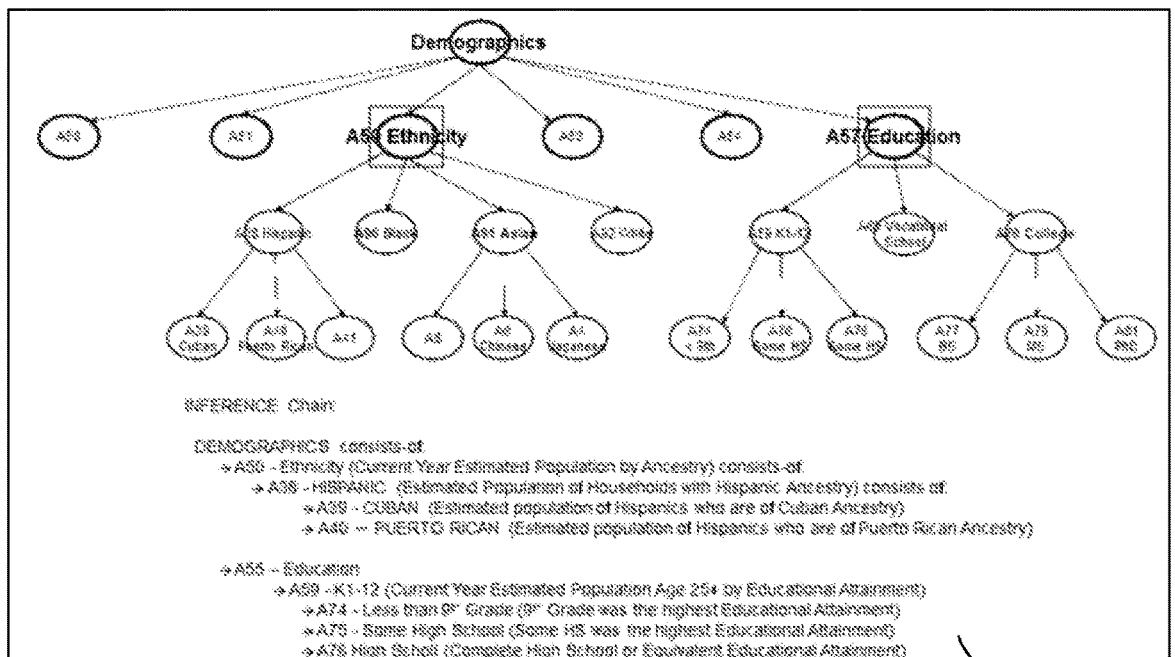

FIG. 10

COLLECTING, ORGANIZING, AND SEARCHING KNOWLEDGE ABOUT A DATASET

TECHNICAL FIELD

This disclosure relates generally to techniques for collecting, organizing, and searching for data in a dataset.

BACKGROUND

Computing devices are used to access various types of information using web-based and other services. For example, a user can operate a computing device to access a web site to retrieve information or use a search system (e.g., a search engine) to find information. Search systems can query a dataset storing information from web sites. Some search systems allow users to enter natural language searches to query a dataset in which the natural language search terms that the users enter for the search do not have to comply with format requirements. The search system translates the natural language searches into queries to the dataset and returns search results accordingly.

The datasets used by natural language search systems are limited to generally only include information from specific types of sources. For example, a dataset of unstructured webpage data will not also include information from a structured database source. Because a given natural language search system uses only specific types of sources, it will not have access to information available on all of the desirable web sites and databases. As a consequence, the user may need to access additional search tools to obtain the desired information. Using multiple, different search tools can require more time and effort and can result in more errors and less satisfactory results. Moreover, these drawbacks will grow worse in the future as the number and variety of information sources grow and the user is required to employ even more additional search tools.

Existing natural language systems often cannot access information from systems that is stored in a way that is only accessible using specialized interfaces and languages. Information in some database systems, for example, can only be accessed using complex search tools that require a search created by someone familiar with each tool's particular search interface and query language. For example, a business person who is unfamiliar with a particular database's query language specifics may have to interact with an information analyst to run reports and queries to get desired business information. Natural language search tools generally do not provide access to information that can only be accessed using such specialized interfaces and languages. In general, additional non-natural language search and/or manual searches may be needed to obtain information from one or more of the information sources that a user uses to search for requested information.

Another problem with existing natural language search systems is that they often rely on data annotations that are manually added to supplement the information. The annotations are used to provide associations between related concepts to allow the user to use their own terminology in the search query. For example, a user may enter a natural language search query using certain terms but the best result may use similar but different terms, and would not be identified without the linking annotations. The annotations in the dataset thus ensure that those search results will be identified by providing associations between the different concepts and terminology that may be entered in a natural language search. Manually identifying and adding annotations to datasets is time-consuming and inefficient. In addition, because such annotations must be manually identified and entered, such annotations may fail to reflect all of the desired associations between concepts. Moreover, absent such annotations, the user must learn and use a specific search vocabulary specific to the dataset to obtain desired results.

SUMMARY

One exemplary embodiment generally involves creating a dataset to facilitate natural language searching of information from a plurality of different source files. More particularly, the exemplary embodiment involves identifying different triple extraction techniques corresponding to source files of different types. A source file can be one or more of a structured, semi-structured, or unstructured file. A triple extraction technique for a source file can depend on the corresponding file type. In this way, the technique can be tailored to extract triples from each of the source files based on the respective file's type. The exemplary embodiment also involves extracting triples from each of the source files using a triple extraction technique corresponding to a type of the respective source file. Each of the triples can be extracted by identifying, from the respective source file, a first natural language phrase as a subject, a second natural language phrase as an object, and an association between the first natural language phrase and the second natural language phrase as a predicate. The exemplary embodiment also involves storing the extracted triples in the dataset.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

FIG. 8 illustrates an example graph model for organizing information, according to certain embodiments of the present invention;

FIG. 9 illustrates another example list for organizing information, according to certain embodiments of the present invention; and FIG. 10 illustrates an example logical model for organizing information, according to certain embodiments of the present invention.

DETAILED DESCRIPTION

Figure 1:
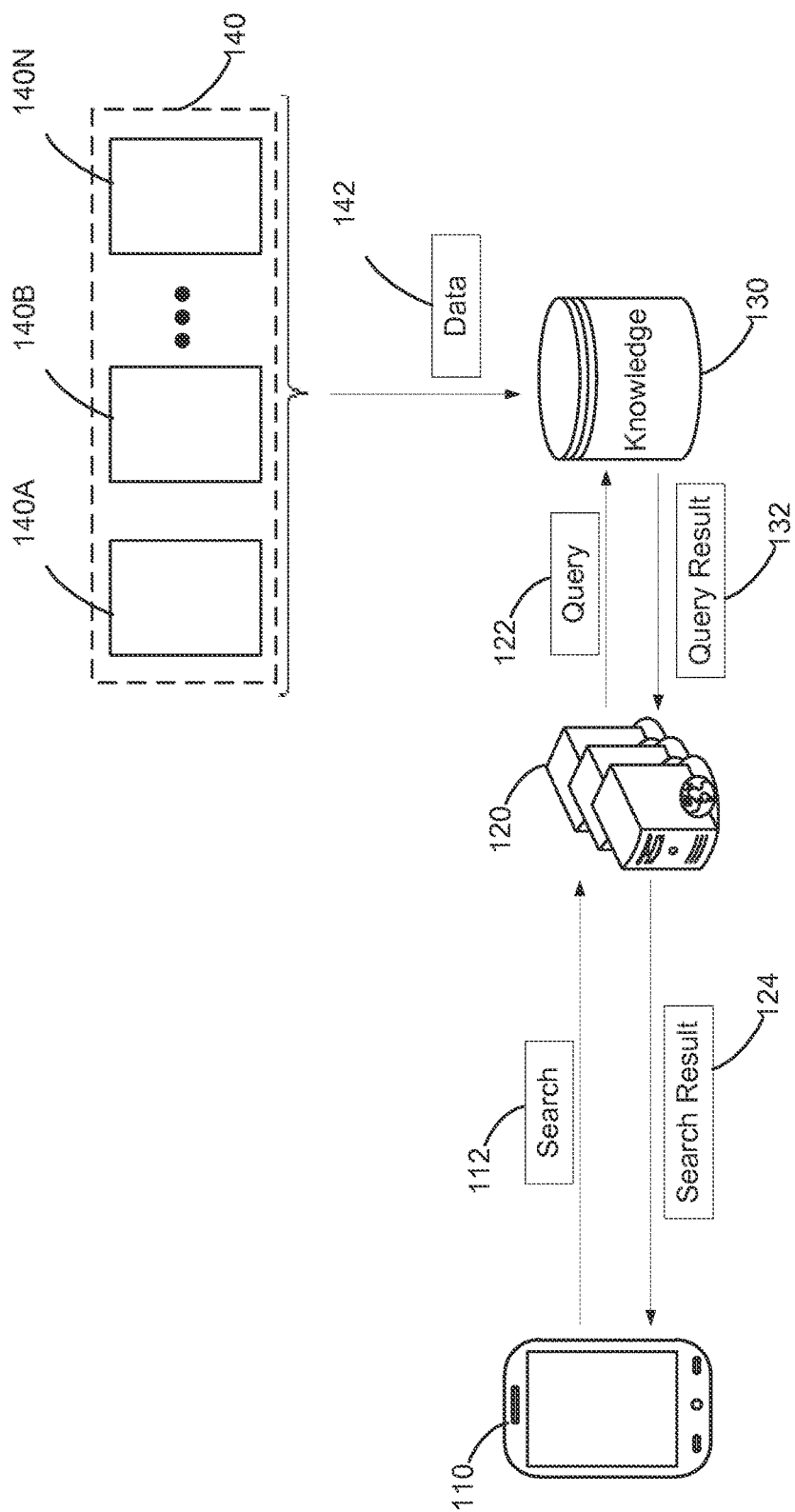
FIG. 1 illustrates an example environment for organizing information to be searched, according to certain embodiments of the present invention.

Specific details of various exemplary embodiments of the present invention are set forth in the following description and are illustrated in FIGS. 1-10. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

As described above, the ability of existing natural language search systems to obtain information in response to natural language requests is limited. Such systems are limited at least because they access information from a limited number of information sources of a same type and are generally unable to obtain information from sources that require specialized access commands, e.g., SQL commands. For example, these systems may generate the dataset from a number of web pages, but not from database tables, text files, and portable document format (PDF) documents. Existing natural language search systems also require using manually-entered annotations in the dataset or require that the searching user enter the search using a specific search vocabulary to ensure that a user's search attempt is not defeated by failing to use the exact terminology for the information of interest.

The systems and techniques herein address these limitations of existing natural language search systems by creating a multi-source dataset of common-format data that can be searched using natural language search techniques. The multi-source dataset is created by extracting information from different sources into a common format that is suitable for search using a natural-language query technique. A natural language search of such a dataset will thus produce information that originated in multiple information sources without requiring the user to employ multiple searches or use specialized search commands. Thus, certain embodiments described herein are directed to creating a natural-language searchable dataset that includes information extracted from different information sources.

In addition, the systems and techniques herein reduce or eliminate the problem of existing natural language search systems needing to include annotations in the dataset or requiring that search queries use a specific search vocabulary by having the dataset include data about associations between elements of the information. The associations are automatically extracted from the information sources when the dataset is created and stored within the information of the dataset. These associations link synonyms, related words, and related concepts within the information such that getting appropriate results does not depend on the person searching using a particular search term. Whatever search term is used, it can be matched to a word from the information, and that word can be further matched to other related words, and so on, such that the search results in identification of appropriate search results. Given a dataset reflecting sufficient associations, essentially any search term can be used as an actionable attribute in a query. This in turn may reduce or eliminate the need to annotate the dataset.

Storing associations between words can also facilitate a natural language search that uses and combines information from diverse information sources. Said differently, if a search term is matched to a word from one source, and that word is related to another word from another source, then the search term can also be matched to the other word from the other source through the association between the two words found in the dataset. To illustrate, consider the example of multiple information sources that include a number of text files, PDF documents, web pages, and database tables storing content about different topics related to cities in the U.S. By analyzing the associations between the words found in the content of the different sources, various topics represented by the associations can be identified, such as population sizes, ethnicities, age groups, occupations, etc. The dataset can store information related to the associations. For instance, the dataset can store an association between a population and a city (e.g., the population size of San Diego), the city and a state (e.g., San Diego is in California), and the state and the U.S. (e.g., California is the most populous state in the U.S.). As such, when a search request about a particular city (e.g., "what is the population size of San Diego?") is received, the dataset can be queried to return search results. These results can include an answer to the question (e.g., the actual population size), and related topics originating from the many different information sources (e.g., population-related topics relevant to San Diego, Calif., and the U.S.).

In an embodiment, triples are used for the common format of the extracted information to store associations extracted from the information. Each triple can include a subject, a predicate, and an object. Each of the subject and the object represents a respective natural language phrase (e.g., one or more words) from the information. The predicate represents an association between the subject and the object. For example, the triple (subject=San Diego, predicate=located, object=California) captures the association of San Diego to California, i.e., that San Diego is located in California. In this way, triples can capture associations between words from the content of the different sources and can support queries to the dataset. For example, a query that includes San Diego as an attribute can be matched to a triple that uses San Diego as a subject. The predicate of the triple can be used to identify an association to the associated object (e.g., that San Diego is located in California). In turn, the object can be used to identify other triples (e.g., a triple capturing the association of California to the U.S.) and so on and so forth.

Using triples for the common format facilitates better searching. To illustrate, and referring back to the example of cities in the U.S., received searches can include natural language inquiries (e.g., "tell me about the population size of San Diego"). To return relevant results, stored triples in the dataset may be used. These triples can represent knowledge that can be queried to return the results. In particular, the triples may document associations between words found in natural language phrases from the text files, PDF documents, web pages and databases. For example, one triple can document that San Diego is a city, and another triple can document that a population size is one topic related to cities. Accordingly, a specific result about the population size of San Diego may be returned based on the two triples. In addition, the results can include comparisons to other cities, other topics related to San Diego, and other results that can be derived from the various associations.

Using triples for the common format also facilitates more efficient extraction of information from different types of information sources. In particular, information from a source is processed to generate an output (e.g., triples) that has a common format regardless of the type of the source. This can avoid variability in the output types and, thus, the need to further process and format such variable outputs into the common format. In addition, because the triples reflect associations between words, annotations of the dataset can be reduced or eliminated. Said differently, attributes from a query can be matched to words in the triples. As such, the dataset need not be annotated extensively, if at all. Instead, the triples themselves can provide the desired association data.

In an example, the extraction process used for extracting the triples from the information may depend on the type of the information source in which the information appears. The phrases "file type" and "type of the file" as used herein refer generally to the format of the information source. A file type can belong to one of three groups: structured, semi-structured, and unstructured file type referring to files (or information source) including structured data, semi-structured data, or unstructured data, respectively. Examples of structured files include databases and tables. Examples of semi-structured files include markup language and JSON files. Examples of unstructured files include text and PDF files.

Different triple extraction processes can be used for different file types. Generally, the triple extraction process used for one file type may differ from the triple extraction process used for another file type. A file-type-specific triple extraction technique may thus be specifically tailored for a particular file type, e.g., text, PDF, HTML, JSON, database, etc. More particularly, the respective file-type-specific triple extraction technique can be based on the underlying structure (or lack thereof) of the file type. For example, if the file is an unstructured file, words may be identified from the information and associations between the words may be detected by applying grammar-based rules. The triples are then extracted to capture the words in, for example, subjects and objects of the triples, and to capture the associations in, for example, predicates of the triples. In comparison, if the file is a structured or a semi-structured file, underlying structures that store or represent logical or hierarchical associations between the words are also identified. In this way, triples are also extracted to capture the structures in, for example, predicates of the triples. Once the triples are extracted, the triples and corresponding identifiers are stored in the dataset as, for example, a list.

Providing such a dataset can improve the efficiency and effectiveness of natural language search systems. Empowering natural language search systems can also reduce or eliminate the learning curve of a user having to master complex and specialized data access commands. Empowering such systems can simplify the required user interactions and thus enable in the field interactions with datasets when the device display area is limited, e.g., from smartphones or tablets. Additionally, empowering natural language search systems can enable intelligent monitoring of user reporting or analytics workflow activities and anticipation of user activities by allowing access to combinations of information from the different sources that would not otherwise be available.

Turning to FIG. 1, that figure illustrates an example computing environment for organizing information in a searchable format. In general, a user operates a computing device 110 to search information from multiple information sources 140A-N (which may be collectively referred to as "information sources 140"). The computing device 110 interacts with a server 120, or some other computing device, over a network to access the information. The server 120 can implement a data knowledge system, as further illustrated in FIGS. 2 and 3, configured to manage a knowledge dataset 130. The knowledge dataset 130 stores information about data from the information sources 140 according to the searchable format. This information can represent a semantic analysis of the data. As such, the server 120 can facilitate providing the information to the computing device 110 from the multiple information sources.

In an embodiment, the computing device 110 may be any type of suitable computing devices, such as a mobile phone, a smart phone, a tablet, a laptop, a desktop computer, a thin client, or any other type of computing devices. In particular, the computing device 110 can host an application configured to search and access information, such as a personal assistant, a web browser, or some other application. The application can allow the user to input a search 112 for information using, for example, natural language. The search 112 can be submitted to the server 120 through, for example, a web request or an application programming interface (API) call. In another example, rather than submitting the search 112, the application can be further configured to translate the search 112 into a query. This query can then be submitted to query the knowledge dataset 130. Regardless of whether a search or a query is submitted, the computing device 110 can receive back a search result 124 from the server 120. In turn, the application can present the search result 124 to the user.

The server 120 may be any type of suitable computing devices, such as one or more servers, a collection of computing devices, a collection of virtual machines, a hosted computing environment, a cloud computing environment, or any other type of computing devices. In particular, the server 120 can host the data knowledge system. This system can be configured to perform various operations including generating and updating the knowledge dataset 130 and providing query results based on queries of the knowledge dataset 130.

For example, in response to the search 112 from the computing device 110, the server 120 translates the search 112 to a query 122, receives a query result 132 based on the query 122, and provides the search result 124 to the computing device 110 based on the query result 132. The query 122 can include an SQL statement or a NoSQL statement. Based on data 142 available from the information sources 140 and as processed and stored in the knowledge database 130, the query result 134 may be generated from the query 122. In turn, the server 120 may send the search result 124 to the computing device 110. The search results 124 can include a human readable version, such as a natural language version, of the query result 132.

Generating and updating the knowledge dataset 130 is further illustrated in the next figures. Briefly, the server 120 accesses the information sources 140 to receive the data 142, processes the data 142, and accordingly updates the knowledge dataset 130. Generally, the knowledge dataset 130 represents a structure for storing the processed data (e.g., semantic information about the data 142). In other words, the knowledge dataset 130 can include a structure configured to organize, manipulate, and/or search a body of knowledge. The data 142 can include natural language and other information stored in structured, semi-structured, and unstructured formats. In comparison, the processed data is stored in a searchable format having a common structure. In an example, the processed data includes triples, entity dictionaries, and mention dictionaries.

A triple represents an expression or mathematical n-tuple indicating or asserting an association or a relationship between a plurality of elements. An element represents a component of a sentence, such as a word or a combination of multiple words. The element may be referred to herein as a "phrase expression." A phrase expression includes one or more words having a particular association. An example of a particular association includes proximity. Proximity can represent two or more words being adjacent, consecutive, or at a particular number of words (e.g., two) away from each other.

An example triple follows the world wide web consortium (W3C) resource description framework (RDF) format. In this example, the triple includes three elements: a subject, a predicate, and an object (S,P,O). The predicate can indicate the association or relationship between the subject and the object. For example, the triples (San Diego, is, in California) and (San Diego, is, a large city) indicate that San Diego is a large city in California.

An entity dictionary represents a structure configured to express or store associations or relationships between a plurality of entities and phrases in which these entities may be found. An entity represents a component of an element of a triple, such as a unigram from a subject or an object of the triple. If an element of a triple (e.g., subject or object) is a single word, the entity would be that single word. In comparison, if the element includes two or more words, each word would be an entity. For example, from the triple (San Diego, is, a large city), "large" and "city" are entities. A phrase includes an entity and remaining component(s), if any, from the corresponding element of the triple (e.g., subject or object). In other words, the phrase can be the subject or the object of a (S,P,O) triple. For example, from the triple (San Diego, is, a large city), "large" is an example entity and "large city" is an example phrase in which the entity "large" is found. A phrase may be also referred to herein as a "mention."

To illustrate an example entity dictionary, consider the triple (John, eats, raw fish) identified as "triple 1," and the triple (Susan, eats, cooked fish) identified as "triple 2." The entity dictionary can follow the form of {john: John; susan: Susan; raw: raw fish; fish: raw fish, cooked fish; cooked: cooked fish}. In this example, John, Susan, raw, cooked, and fish are entities. In comparison, John, Susan, raw fish, and cooked fish are phrases. This example entity dictionary lists the different entities in associations with the phrases in which these entities participate.

Although a dictionary is used as an example of a structure for representing associations or relationships between entities and phrases, other structures may be used such as lists, tables, structured files (e.g., javascript object notation (JSON) files), databases, or other structures. Similarly, although an entity is illustrated as a unigram, bigrams or higher degree n-grams can be also be used to define entities. In addition, a phrase can more generally include an entity and optionally one or more words associated with the entity.

A mention dictionary represents a structure configured to express or store association or relationships between a plurality of phrases (or mentions) and triples. These triples may include entities or words found in the phrases. Here again, a dictionary is one example of a structure. However, other structures can be similarly used as described in connection with the entity dictionary. To illustrate, and referring back to the "triple 1" and "triple 2" examples, the mention dictionary would include {Subject: {John: triple 1; Susan: triple 2}; Object: {raw fish: triple 1; cooked fish: triple 2}}. In this example, the mention dictionary lists the different phrases used in the subjects and objects of the triples and identifies, for each phrase, the associated triple.

By storing the triples (e.g., in a RDF format), the entity dictionary, and the mention dictionary, information contained therein can be retrieved via a query language (SQL or NoSQL statements). As such, the knowledge dataset 130 can include a searchable version of knowledge about the data 142 from the various information sources 140, regardless of the type of the data 142 and the type and number of the information sources 140. Querying the knowledge dataset 130 can include returning, in response to a query keyword, triples. These triples are found not only based on matching the query keyword, but also based on exploring the associations or relationships from the entity and mention dictionaries. As further illustrated in the next figures, generating and updating the knowledge dataset 130, including the triples and the entity and mention dictionaries, can involve an automated, efficient, and scalable process.

In an illustrative use case, the user of the computing device 110 may input at the personal assistant application the question of "what is the size of the population of San Diego?" The server 120 may have processed data from information sources 140 such as from WIKIPEDIA and a number of other web sites, to update the knowledge data set 130 with triples and entity and mention dictionaries. In response to the user's question, the server 120 may retrieve various triples associated with the elements of the question and may construct an answer, such as "according to the 2010 United States Census, the population of San Diego is 1,307,402." In addition, based on stored associations in the triples and the dictionaries, the server 120 may construct a number of other answers and suggestions related to the elements of the question. For example, the server 120 may respond with a question asking the user "are you interested in the percentage increase of the population of San Diego over the last three decades?" or any other relevant topic to "San Diego," "cities in the U.S.", or "population sizes."

Figure 2:
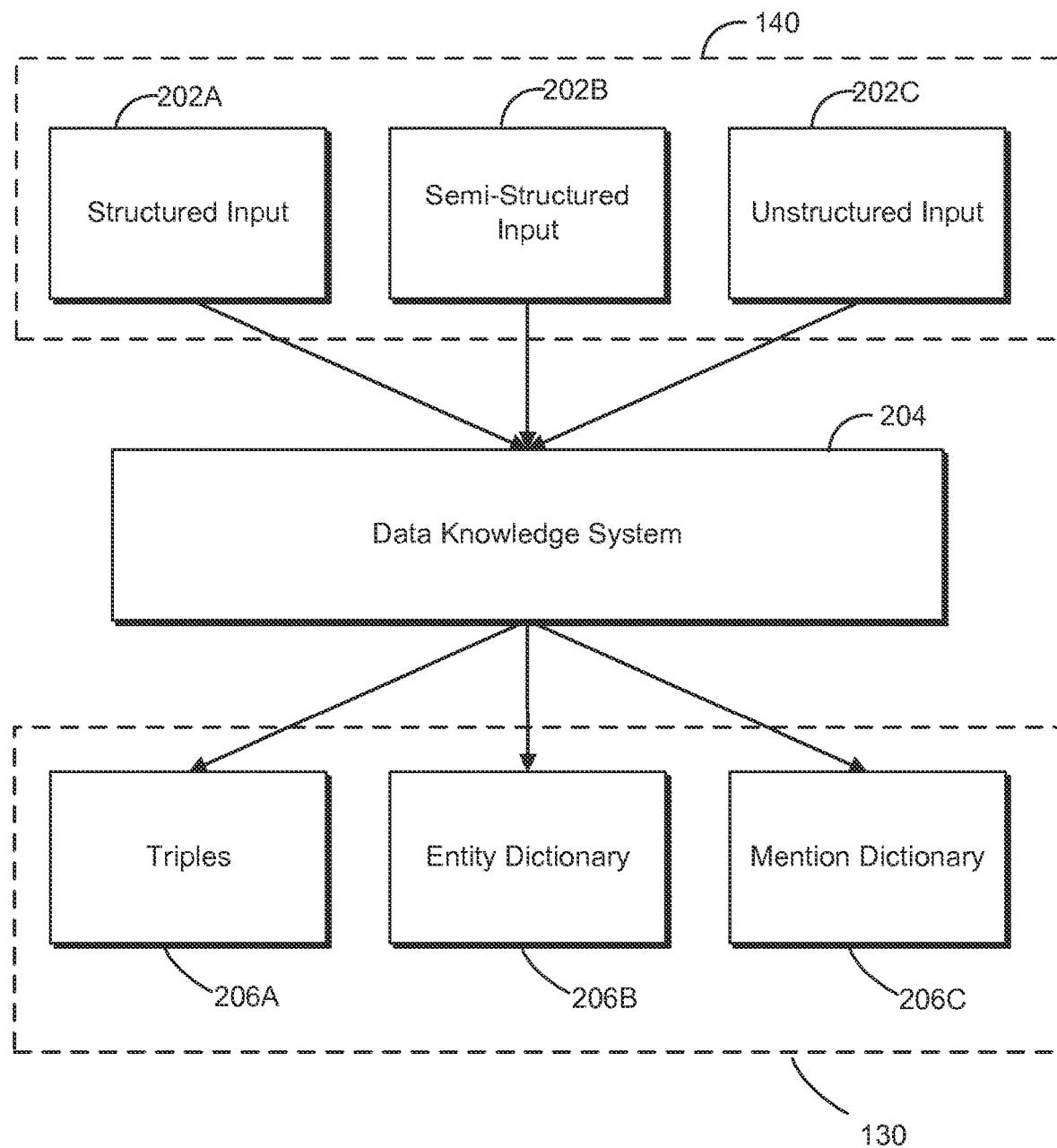
FIG. 2 illustrates an example architecture for organizing information, according to certain embodiments of the present invention.

Turning to FIG. 2, that figure illustrates an example data knowledge system 204, similarly to the data knowledge system described in connection with FIG. 1. In particular, the data knowledge system 204 can be configured to process data from a plurality of information sources 140, to generate and update the knowledge dataset 130 based on the processed data, and to provide query results from the knowledge dataset 130.

As illustrated in FIG. 2, the information sources 140 are provided as input to the data knowledge system 204. In other words, the data knowledge system may access the information sources 140 over, for example, a network and retrieve content therefrom. The content includes data in different formats. Generally, the information sources 140 may be categorized in multiple categories such as structured input 202A, semi-structured input 202B, and unstructured input 202C. The structured input 202A represents source files storing structured data, such as databases, tables, and other source files. Semi-structured input 202B represents source files storing semi-structured data such as XML, HTML, JSON, and other source files. The unstructured input 202C represents source files storing unstructured data, such as books, journals, documents, metadata, word-processor document, a TXT file, a PDF file, and other source files.

Furthermore, content (e.g., data) of the information sources 140 typically includes text, such as natural language text. However, other types of content can be available. For example, the information sources 140 can include images, audio, video, or other multimedia content. Non-text content can be translated into text using various techniques. For example, optical character recognition, image recognition, machine learning, captioning, tagging, speech-to-text, and other techniques are available to convert the non-text content into text.

Figure 3:
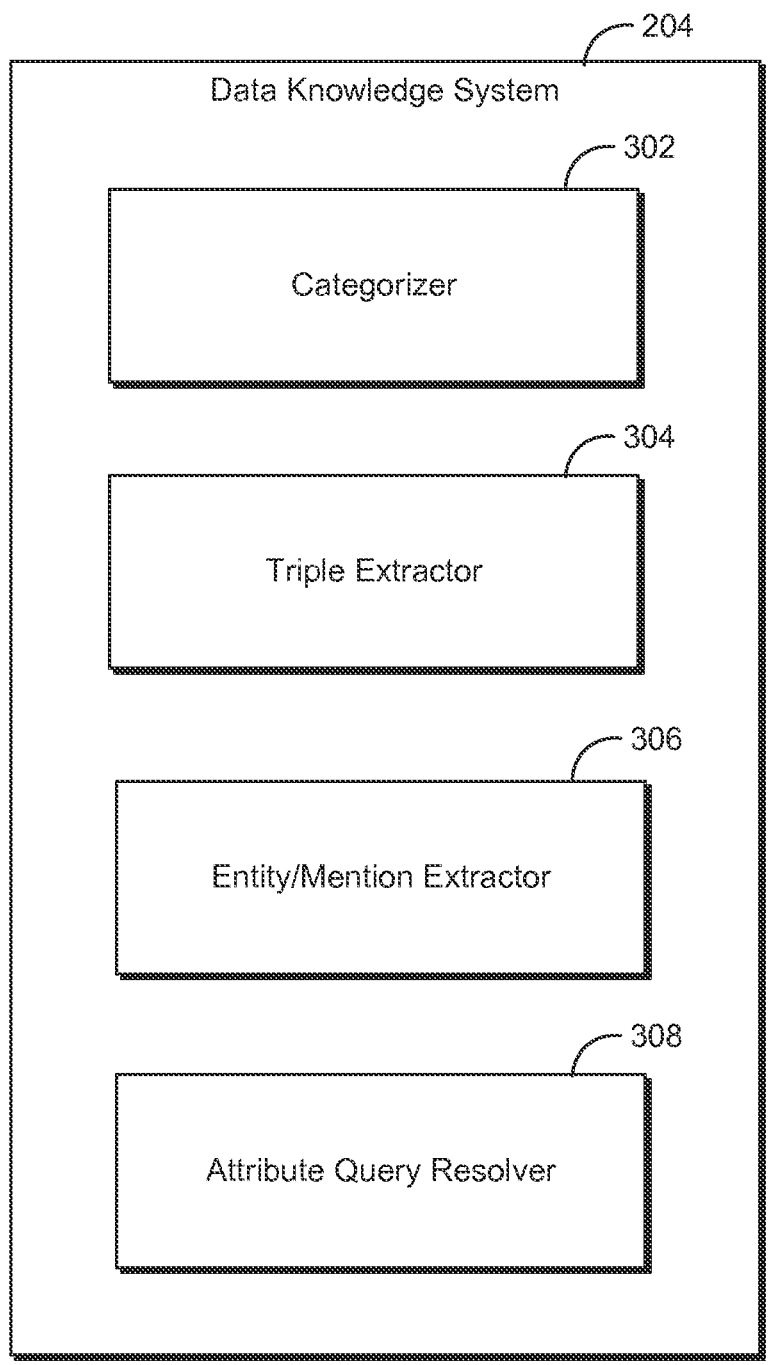
FIG. 3 illustrates an example system for organizing information, according to certain embodiments of the present invention.
Figure 4:
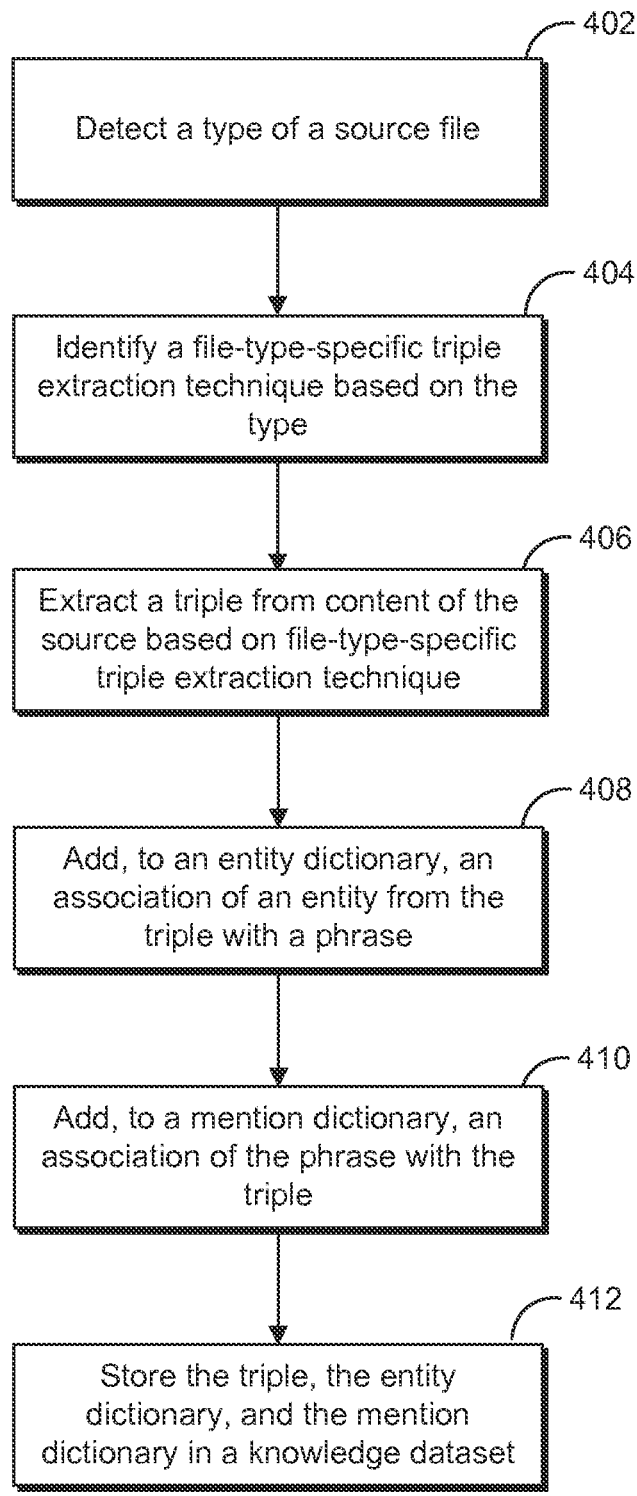
FIG. 4 illustrates an example flow for organizing information to be searched, according to certain embodiments of the present invention.
Figure 5:
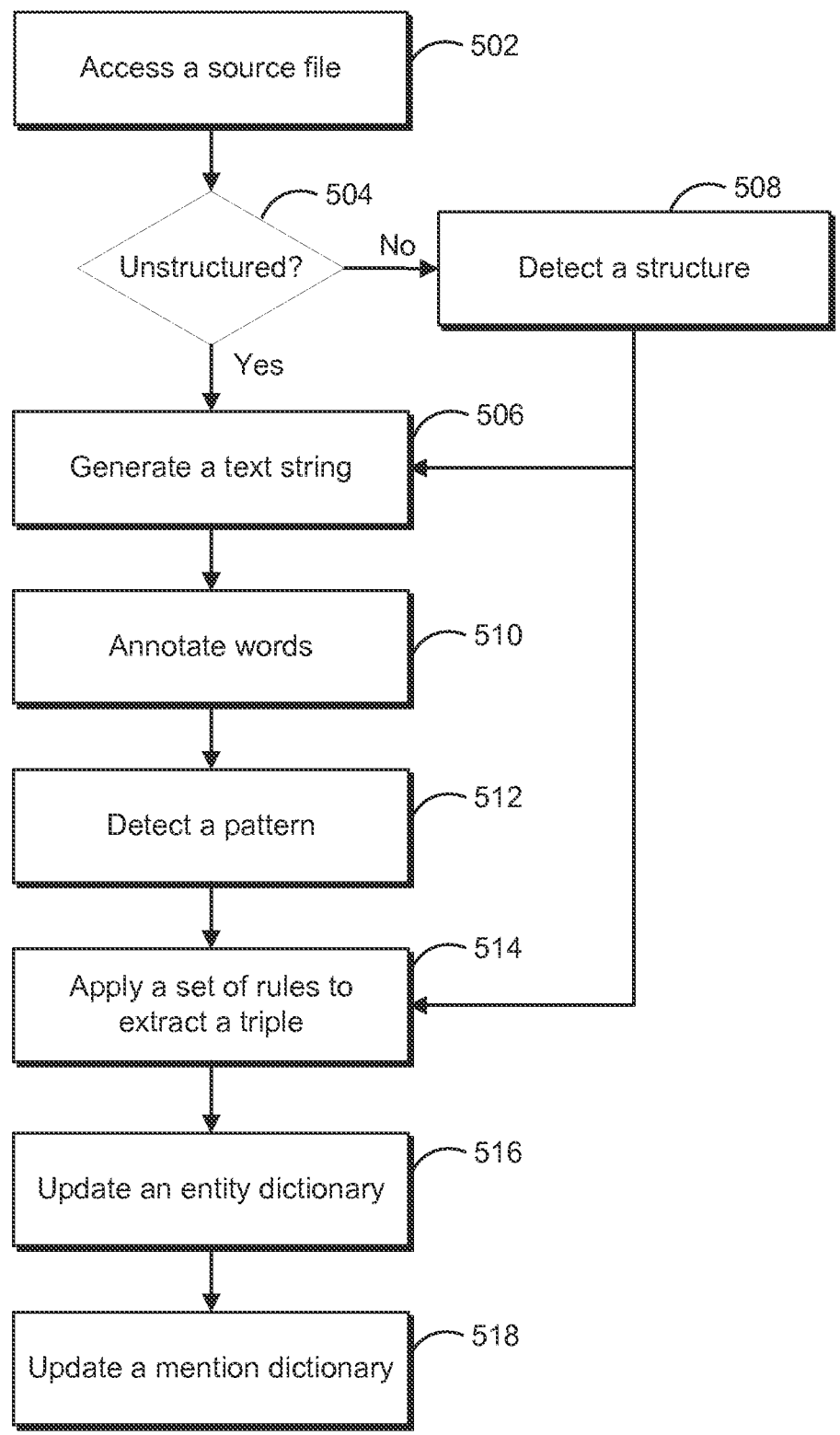
FIG. 5 illustrates an example flow for organizing information, according to certain embodiments of the present invention.
Figure 6:
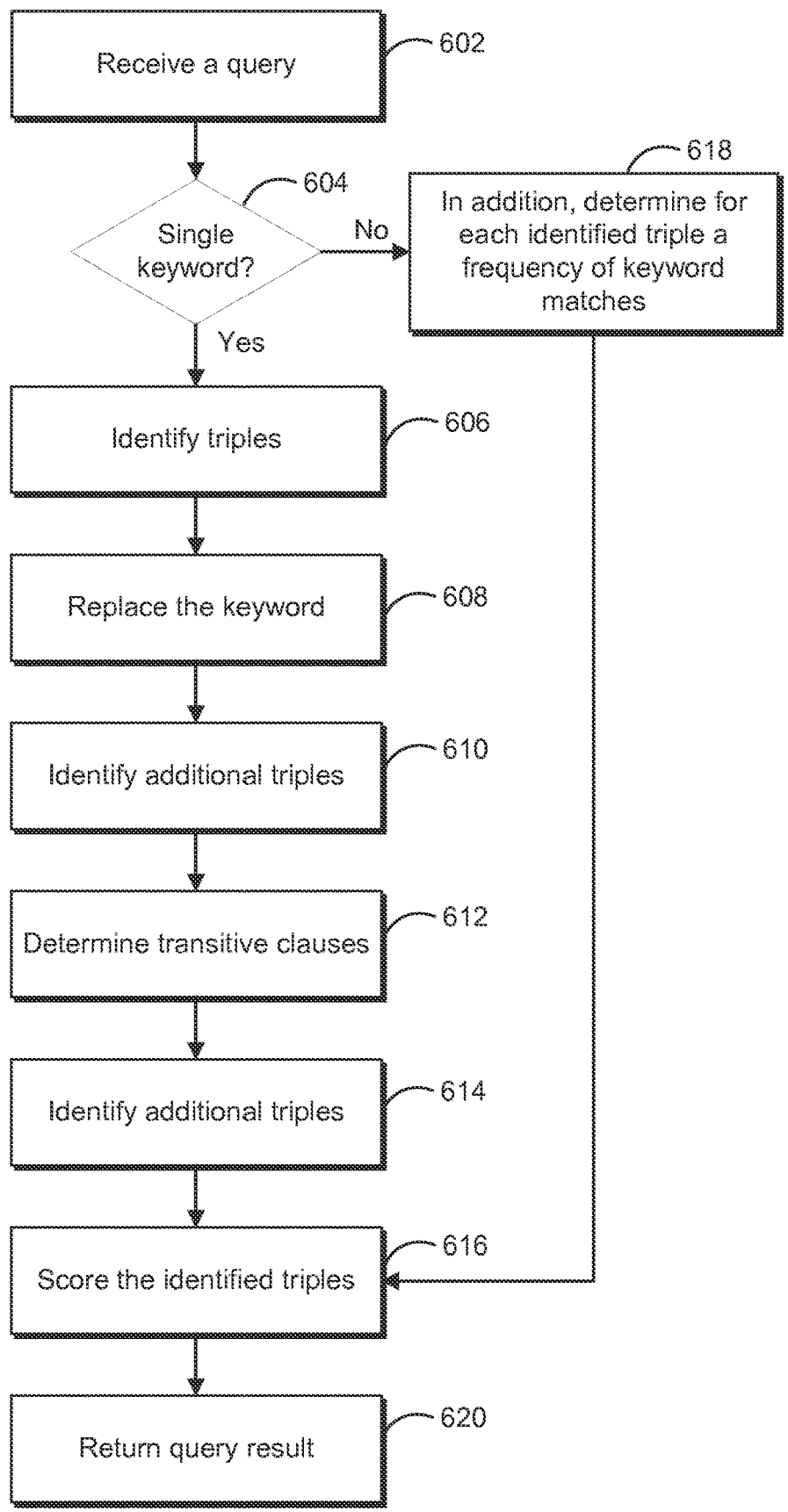
FIG. 6 illustrates an example flow for searching organized information, according to certain embodiments of the present invention.

The data knowledge system 204 receives and processes the content to generate or update the knowledge dataset 130. FIG. 3 further illustrates example modules that the data knowledge system 204 can implement to receive and process the content. FIGS. 4-6 further illustrate example flows that the modules can implement to receive and process the content. Briefly, the data knowledge system 204 (e.g., the modules) categorizes the content based on the corresponding content type, extracts triples from using a set of rules applicable based on the content type, extracts the entity and mention dictionaries from the triples, and resolves keyword queries based on the triples and the entity and mention dictionaries.

As illustrated, the knowledge dataset 130 includes triples 206A, an entity dictionary 206B, and a mention dictionary 206C. The triples 206A can be stored in a list or in another structure. In an embodiment, the knowledge dataset 130 stores one list of triples 206A, one entity dictionary 206B, and one mention dictionary 206C corresponding to the data processed from the various information sources 140. In another embodiment, the knowledge dataset 130 stores a varying number of lists of triples, entity dictionaries, and mention dictionaries for each or for a subset of the information sources 140. For example, the knowledge dataset 130 can store a list of triples, one entity dictionary, and one mention dictionary for content available from WIKIPEDIA, and another list of triples, another entity dictionary, and another mention dictionary for a number of other online content sources. As described herein above, the knowledge dataset 130 generally represents a structure configured to organize, manipulate, and/or search a body of knowledge. The data management system 204 can output multiple types of knowledge models from this body of knowledge. FIG. 8 illustrates a graph structure as an example output. In comparison, FIG. 9 illustrates a table as an example output and FIG. 10 illustrates a logical model as an example output.

Turning to FIG. 3, that figure illustrates example modules that the data knowledge system 204 can implement. The modules can be configured to receive and process content from the plurality of information sources 140 and, accordingly, generate or update the knowledge dataset 130. Generally, a module represents hardware, software implementable on hardware, or a combination of both. For example, a module can include computer-readable instructions that, when executed on a processor, configure the processor to perform a function.

As illustrated in FIG. 3, the data knowledge system 204 implements a categorizer 302. The categorizer 302 can be configured to categorize content accessed from the information sources into a corresponding content type. The content type can indicate whether the content includes structured, semi-structured, or unstructured data. Based on the content type, the categorizer 302 can be configured to generate stratified data. Generally, stratified data includes a representation of the content according to the content type, where this representation can be used for extracting triples. Said differently, whereas the input to the categorizer 302 may include heterogeneous data (e.g., content in different formats), the output may include the stratified data (e.g., representation of the content usable to extract triples).

In an embodiment, the categorizer 302 analyzes the information sources 140 to discern what type of format the content may be in and accordingly generate the stratified data. For example, if an information source includes a web page, the categorizer 302 calls a crawler. The crawler can then access and gather all the text from the web page. The text can be stored as a single string (e.g., a string object). In addition, if the web page includes tables, a list of the tables can be created and stored. In comparison, if the information source includes a file extension (e.g., .txt, .pdf, .json, etc.), the categorizer 302 routes the content based on the file extension to appropriate document readers. In the case of a TXT file, the categorizer 302 calls a TXT reader. The TXT reader can create and store a single string for all the text in the file. In the case of a PDF file, the categorizer 302 calls a PDF reader. The PDF reader can extract all the text from the PDF file, including captions for images, titles, etc., and create and store a string for all the text and captions in the file. In the case of a JSON file, the categorizer 302 calls a JSON reader. The JSON reader can first use dictionary key-value relationships to discern a hierarchical relationship between the various elements and can create and store a tree-like structure representing the hierarchical relationship. The JSON reader can also create and store a string from the actual terms of the keys and values. As such, the categorizer 302 can be configured to input heterogeneous data (e.g., .txt, .pdf, and. json files, and universal record locators (URLs) to web pages) and output stratified data (e.g., a string, a table, a structure). In this illustrative embodiment, the various types of inputs and outputs are provided for illustrative purposes. Other types of inputs and outputs may be similarly used. In particular, the stratified data generally includes one or more of: natural language data (e.g., represented as a string), hierarchical data (e.g., represented as a tree-like structure), and tabular data (e.g., represented as a multi-dimensional array).

The data knowledge system 204 also implements a triple extractor 304. The triple extractor 304 can be configured to extract triples from the content based on the content type and to store the triples and identifiers of the triples as, for example, a list in the knowledge dataset 130. For example, the triple extractor 304 can receive the stratified data from the categorizer and call, depending on the type of the stratified data (or the corresponding source file or content), a process to extract the triples. Example processes for extracting the triples are further illustrated in FIGS. 4 and 5.

In an embodiment, if the input includes natural language text (e.g., a string), the triple extractor 304 can apply a segmentation, tokenization, and parsing process to detect words and apply part-of-speech tagging and noun/verb/adjective expression tagger to the words. This enables the triple extractor 304 to tag a word in a sentence with a word type (e.g., the type of speech the word corresponds to, such as noun, verb, adjective, preposition, a number, a formula, etc.) The triple extractor 304 can also group proximate words (e.g., consecutive, adjacent, etc.) as part of a phrase expression (e.g., a noun phrase, a verb phrase, an adjective phrase). In an embodiment, finding these words and phrase expressions can be implemented using the SEDONA tagger available from ADOBE, the E. BRILL tagger, or another rule-based or stochastic tagger.

Once the words are tagged and the phrase expressions are found, the triple extractor 304 can apply a set of rules thereto to extract a triple. The rules represent a grammar that captures common forms of knowledge encoding within typical natural language sentence structure based on the part of speech relationship. The grammar covers rules for typical noun-verb-noun relationships and noun-verb-adjective relationships. In addition, the grammar accounts for various prepositions, described nouns (e.g. blue cat), adverbs relationships (e.g. runs fast) and possessive nouns (e.g., John's car).

To illustrate, consider the example of "John eats raw fish." The triple extractor 304 can first tag this sentence into a part of speech as follows: John/Noun, eats/Verb, raw/Adjective fish/Noun (raw fish—noun phrase). The triple extractor 304 can then leverage the grammar rules and discern two pieces of knowledge: first the triple (John, eats, raw fish), and the second triple (fish, can be, raw).

Pseudo-code for different rules that the triple categorizer 304 can apply is listed herein next.

with the natural language input, the triple extractor 304 infers any triples from the terms within tables/columns/cells of the table.

The data knowledge system 204 also implements an entity/mention extractor 306. The entity/mention extractor 306 can be configured to store, for each triple, an entity and a mention (e.g., a phrase) in, for example, an entity dictionary and a mention dictionary, respectively. In an embodiment, for each triple, the entity/mention extractor 306 extracts the entities and a mention for both the subject of the triple and the object. As described herein above in connection with FIG. 1, the entities can include all the unigrams (or higher degree n-grams) found within that part of the triple (either the subject or the object). In comparison, the mention can include the entire part of the triple (either the subject or the object). As such, the information stored in the dictionaries represents the words/phrases composing a subject/object for all triples.

In addition, to help later matching (e.g., in response to a query), the entity/mention extractor 306 also removes any

```
# [ NP_a, VP, NP ]; or [ NP_a, VP, AP ]...where... // NP: noun phrase, NP_a: noun phrase with
a preposition, VP: verb phrase, AP: adjective phrase
# NP = {NX, NX (IN NX)*, NX (TO NX)*, NX (IN NX)* (TO NX)*}, // NX: noun expression
# NP_a = {NX, NX IN, NX TO, NX (IN NX)*, NX (TO NX)*, NX (IN NX)* (TO NX)*}
# VP = {VX, VX IN, VX TO, VX DT} // VX: verb expression
# AP = {AX, AX IN NX} // AX: adjective expression
#rule 1
    # NP_i VP NP_i+1 CC NP_i+2 = NP_i VP NP_i+1 CC NP_i+2 <and> NP_i VP NP_i+1
<and> NP_i VP NP_i+2
    # NX VX NX CC NX_a = NX VX NX CC NX_a, NX VX NX, NX VX NX_a
#rule 2
    # NP_i VP_j NP_i+1 CC VP_j+1 NX_i+2 = NP_i VP_j NP_i+1 CC VP_j+1 NX_i+2
<and> NP_i VP_j NX_i+1 <and> NP_i VP_j+1 NP_i+2
    # NX VX NX CC VX_a NX_a = NX VX NX, NX VX_a NX_a
Described Verb
    RB VB -> (VB, has adverb, RB) // RB: adverb, VB: verb
    VB RB -> (VB, has adverb, RB)
Described Noun
    JJ NN -> (NN, has adjective, JJ) // JJ: adjective, NN: noun
Possessive Noun
    NN_i's NN_j -> (NN_i, has, NN_j) // NN_i: noun I, NN_j: noun j.
```

In comparison, if the input includes hierarchical data (e.g., tree-like structure), the triple extractor 304 can infer knowledge that represents the relationship found within the hierarchical structure. For example, the triple extractor 304 generates a triple for each edge (or node) in the hierarchical tree-like structure and infers the relationship from the links between the edges (or nodes). To illustrate, if hierarchical data from a JSON file includes {john: {eats: {raw fish} } }, the triple extractor 304 can infer the triples (John, has child relationship, eats) (eats, has child relationship, raw fish). In addition, and as described above in connection with the natural language input, the triple extractor 304 would infer the natural language triple (fish, can be, raw). In this way, the triple extractor 304 codifies both the natural language knowledge and the structured knowledge represented in the JSON file.

If the input includes tabular data such as a table, the triple extractor 304 infers a triple for each relational component of the table. For example, the triple extractor 304 can create a triple for each cell in the table and can infer a relationship based on the corresponding row and column. An example process for extracting this type of relationship is further described in U.S. Pat. No. 8,037,108 filed on Jun. 22, 2009, entitled "Conversion of Relational Databases Into Triple-stores," which is incorporated herein by reference in its entirety. In addition, and as described above in connection punctuations and capitalization from the entity dictionary. Further, a key of the entity dictionary includes a word, whereas a corresponding value includes the mentions in which the word participates. Similarly, a key of a mention dictionary includes a mention, whereas a corresponding value includes triples in which the mention participates. In this way, for each triple, there can be dictionaries which, given a word or mention (e.g., phrase), can point to all triples containing that word/mention (and inform which part of the triple, either subject or object, contains the word or mention).

Furthermore, the data knowledge system 204 also implements an attribute query resolver 308. The attribute query resolver 308 can be configured to return triples from the knowledge dataset 130 in response to queries. An example flow for querying the knowledge dataset 130 is further illustrated in FIG. 6. In an embodiment, the returned triples can be found by matching keywords from the queries and by exploring the different relationships between the elements of the triples as identified in the entity and mention dictionaries. Further, the attribute query resolver 308 can expand the queries by replacing keywords with synonyms, hypernyms, and thesaurus equivalent words. For example, related words can be stored in and found from the knowledge dataset 130 or a different data store. This can include storing, for example, the WordNet database, a metonym database, and different thesauri. Similarly, the attribute query resolver 308 can also expand the queries by looking for transitive clauses. For example, a transitive clause can represent subject-to-object or object-to-subject transitions. To illustrate, consider the example triple of (John, eats, fish). Fish, the object in this triple, can be a subject in another triple such as (fish, can be, raw). Thus, the attribute query resolver 308 can expand the queries by considering both triples through this object-to-subject transition. Each found triple can be scored depending on various factors to return triples in a ranked order. The factors can include, for example, the keyword matching, the use of replacement keywords, and the use of transitive clauses.

Turning to FIGS. 4-6, those figures illustrate example flows for organizing and querying data in triples, entity dictionaries, and mention dictionaries. In particular, FIG. 4 illustrates an example flow for organizing the data and FIG. 5 illustrates another example flow for organizing the data. In comparison, FIG. 6 illustrates an example flow for querying the data. Some of the operations between the example flows of FIGS. 4-6 may be similar. In the interest of clarity of explanation, such similarities are not repeated herein.

In the illustrative operations, each of the operations or functions may be embodied in, and fully or partially automated by, modules executed by one or more processors of a computing device. These modules may correspond to, for example, the modules of the data knowledge system 204 described in connection with FIG. 3. An example computing device implementing such modules is further illustrated in FIG. 7. Additionally, while the operations are illustrated in a particular order, it should be understood that no particular order is necessary and that one or more operations may be omitted, skipped, and/or reordered.

Turning to FIG. 4, an example flow for generating a knowledge dataset that includes a triple, an entity dictionary, and a mention dictionary is illustrated. In the interest of clarity of explanation, a single triple, entity dictionary, and mention dictionary are described. However, the example flow similarly applies to a plurality of triples, entity dictionaries, and mention dictionaries. Further, the example process may similarly apply to updating, rather than generating, the knowledge dataset with the triple(s), entity dictionary(ies), and mention dictionary(ies).

The example process starts at operation 402, where a type of a source file is detected. For example, a categorizer of a data knowledge system implemented on a computing device can access the source file. The source file may be received from an information source and can include structured, unstructured, or semi-structured data. The categorizer can detect the type of the source file based on, for example, an extension of the source file.

At operation 404, a file-type-specific triple extraction technique is identified based on the type of the source file. For example, depending on the type of the source file (e.g., the type of data the source file includes), the categorizer calls a reader or a crawler, or some other method, to generate stratified data from the content of the source file. This data can include natural language text, tabular data, and hierarchical data. Each of the extraction techniques can be different from the other by applying various criteria. One set of criteria relates to generating the stratified data (e.g., which reader to call or crawler). Another set of criteria relates to extracting the triples from the stratified data as further illustrated at operation 406. Generally, this set of criteria includes a plurality of rules, some of which may be grammar-based and depend on natural language and some of which may be structure-based and depend on structure of the data.

At operation 406, a triple is extracted from the content of the source file based on the type of the source file and/or the file-type-specific triple extraction technique. For example, a triple extractor of the data knowledge system can receive and process the stratified data. If natural language text is processed, the triple extractor can tokenize, parse, and speech tag the text to determine sentences, words within the sentences, word types (e.g., noun, verb, adjective, etc.), and phrase expressions (e.g., noun phrases containing a noun and a proximate such as a consecutive word). The triple extractor can consider a set of words or phrase expressions (e.g., within a sentence) and apply a set of rules to generate a triple (or a number of triples). The triple can include a subject, predicate, and object based on the applied rules. This operation would be similarly applied also to hierarchical and tabular data to extract the triples from the actual text in this data. In this case also, the triple extractor can infer and generate triples from any structural relationships defined in the hierarchy or table.

At operation 408, an association of an entity with a phrase can be added to an entity dictionary. The entity can include a component of an element of the triple, such as a unigram from the subject or object of the triple. The phrase can include the entire element of the triple, such as the subject or object. For example, an entity/mention extractor of the data knowledge system can parse the triple and remove punctuations and capitalizations. For each entity in the triple, the entity/mention extractor can look up or add, if non-existing, a corresponding key to a key-value pair of the entity dictionary and add the associated phrase(s) that contains the entity to the value of the key-value pair.

At operation 410, an association of the phrase with the triple can be added to the mention dictionary. For example, for a phrase, the entity/mention extractor can look or add, if non-existing, a corresponding key to a key-value pair of the mention dictionary and add an identifier(s) of the triple(s) that contains the phrase to the value of the key-value pair.

At operation 412, the triple(s), entity dictionary (or updates thereto), and the mention dictionary (or updates thereto) are stored in a knowledge dataset. For example, the triple extractor can store the triple(s) and identifier(s) of the triple(s) as a list in the knowledge dataset. Similarly, the entity/mention extractor can store the entity dictionary and the mention dictionary or updates to the two dictionaries in the knowledge dataset. The updates include any new associations between entities and phrases and phrases and triples found based on analyzing new or existing content from an existing or new source file.

Turning to FIG. 5, another example flow for generating a knowledge dataset that includes a triple, an entity dictionary, and a mention dictionary is illustrated. The example flow of FIG. 5 starts at operation 502, where a source file is accessed by, for example, a data knowledge system implemented by a computing device. The source file can be one of many files available from a plurality of information sources. These sources, or the source file on its own, can include heterogeneous data. For example, the source file can include one or more of a TXT file, a PDF file, a JSON file, or a web page.

At operation 504, a determination is made of whether the source file includes unstructured data. This can allow the generation of stratified data as further illustrated at operations 506 and 508. For example, a categorizer of the data knowledge system considers the extension of the source file to make the determination. If the source file contains unstructured data, operation 506 is followed. If the source file contains semi-structured or structured data, operation 508 is followed.

At operation 506, a text string from the unstructured data is generated. For example, the categorizer calls a reader or some other method to generate the string and saves the string as a string object. In comparison, at operation 508, the categorizer also detects and stores a structure based on the hierarchical or other relationships between the terms of the semi-structured and structured data. Operation 508 is also followed by operation 514 to allow the extraction of a triple for that structure. Further, operation 508 is additionally followed by operation 506 such that the categorizer generates a text string from the actual terms of the semi-structured and structured data.

At operation 510, words in the text string are annotated. At this operation, a text string (or a string object) may be inputted to a triple extractor of the data knowledge system. The triple extractor can tokenize and parse the text string to determine the words and corresponding sentences. The triple extractor can also perform speech tagging on the words. This allows tagging each word in a sentence with the type of speech the word is (e.g., noun, verb, adjective, preposition, etc.) and grouping proximate words (e.g., consecutive, adjacent, within a number of words) as part of phrase expressions (e.g., noun phrase starting with a noun, a verb phrase starting with a verb, etc.).

At operation 512, a pattern is detected. The pattern can be associated with words in a sentence and can be used to determine what rule(s) should apply to the sentence to extract triple(s). For example, the triple extractor considers the sentence and detects the pattern from the words in the sentence, corresponding word types (e.g., type of speech), and corresponding phrases. To illustrate, the pattern can be noun-verb-noun, noun phrase-verb-adjective phase, or any other pattern.

At operation 514, a set of rules is applied to extract a triple. For example, the triple extractor can access the rules from storage and determine which rule(s) to apply to a sentence based on the detected pattern corresponding to that sentence. Generally, the rules represent a grammar that captures common forms of knowledge encoding within a typical natural language sentence structure based on the part of speech relationship. In addition, each rule may have a set of parameters. For example, parameters of one rule can indicate that the rule should be applied if the sentence includes a noun-verb-noun pattern. If the detected pattern matches the parameters, the triple extractor can apply that rule to the sentence.

Additionally, at operation 514, the triple extractor can extract a triple for a structure detected from structured or semi-structured data (as illustrated at operation 508). Here, the triple extractor can apply another set of rules. These rules may not relate to grammar. Instead, the rules relate to the structure itself and express relationships that can be derived from the structure. For example, if the structure includes a first word in a parent node and a second word in a child node of the parent node, the triple extractor generates a corresponding triple of (first word, has child relationship, second word).

At operation 516, an entity dictionary is updated. For example, an entity/mention extractor of the data knowledge system determines an entity from an extracted triple and a mention (e.g., a phrase) containing the entity from also the extracted triple. To minimize variations across triples, any punctuation and capitalization can be also removed. The entity/mention extractor can then add or update a key-value pair of the entity dictionary with the entity, as a key, and the mention as a value.

At operation 518, a mention dictionary is updated. For example, the entity/mention extractor considers a mention (e.g., a phrase) from an extracted triple and an identifier of the triple. The entity/mention extractor then adds or updates the mention and the identifier a key-value pair of the mention dictionary with the mention, as a key, and triple identifier as a value.

Turning to FIG. 6, an example flow for querying triples stored in a knowledge dataset is illustrated. Generally, the triples can be found based on a combination of techniques including matching keywords of the query, replacing the keywords with related words, and using transitive clauses. These techniques allow the expansion of the query. In addition, the found triples can be scored based on the used technique. This allows the found triples to be ranked.

The example flow of FIG. 6 starts at operation 602, where a query is received. For example, an attribute query resolver of a data knowledge system may receive an SQL or NoSQL query. At operation 604, a determination is made of whether the query is a single word query. If so, operation 606 is followed. Otherwise, operation 618 is followed.

At operation 606, the triples are identified based on the single keyword. This may involve using an entity dictionary, a mention dictionary, and a list of triples from the knowledge dataset. For example, the attribute query resolver matches the keyword to an entity from a key of the entity dictionary and determines one or more mentions from a corresponding value. Next, the attribute query resolver matches each of the mentions to a key of the mention dictionary and determines one or more triple identifiers from a corresponding value. The attribute query resolver then retrieves corresponding triple(s) from the list of triples based on the determined triple identifier(s).

At operation 608, the keyword is replaced with related terms. Using the related terms allows finding additional triples as further illustrated at operation 610. For example, the attribute query resolver replaces a keyword with synonym, hypernym, or thesaurus equivalent words. To do so, the attribute query resolver can look-up the synonyms and hypernyms from a WordNet database. To find an equivalent word, the attribute query resolver can leverage a number of thesauri, such as the Synonym Finder, Webster's New Word Roget's A-Z Thesaurus, Twenty-First Century Synonym and Antonym Finder, The Oxford Dictionary of Synonyms and Antonyms, A Dictionary of Synonyms and Antonyms, Scholastic Dictionary of Synonyms, and Antonyms and Homonyms. In an embodiment, the attribute query resolver can find that two words are equivalent based on the directionality of the synonym relationship between two words. If the two words are synonyms of each other (e.g., the synonym relationship is bi-directional), the two words are equivalent. To illustrate, if a thesaurus indicates that a synonym of "cop" is "policeman" and a synonym of "policeman" is "cop," these two words are equivalent because of the synonym bi-directionality.

At operation 610, additional triples are found based on the related term(s). For example, the attribute query resolver uses the related term(s) and performs an operation similar to operation 606 to find the additional triples.

At operation 612, transitive clauses are determined. Using the transitive clauses allows finding additional triples as further illustrated at operation 614. A transitive clause can represent a subject-to-object transition (a broadening transition) or an object-to-subject transition (a narrowing transition). For example, for a found triple (e.g., (French, are, European)), the attribute query resolver considers the subject (e.g., the word "French") and the object (e.g., the word "European") of the triple. Next, the attribute query resolver generates two transition clauses. In the first one, the subject becomes the object (e.g., the transition would look like subject-to-object: French). In the second one, the object becomes the subject (e.g., the transition would look like subject: European-to-object).

At operation 614, additional triples are identified based on the transition clauses. For example, the attribute query resolver determines the transitive clauses for each found triples and identifies, from the list of triples, the additional triples using the transitive clauses. This allows the attribute query resolver to return a chain of triples. To illustrate the use of an object-to-subject transition, the attribute query resolver considers a first found triple, determines the object of that triple, determines a transition where the object becomes a subject, identifies another triple that uses this transitional subject, considers the object of this other triple, determines another transition and repeats the process. For instance, the first triple can be (French, are, European). By considering the object "European," the attribute query resolver can find a second triple of (European, are, people). By considering the object "people," the attribute query resolver can find a third triple of (people, are, *Homo sapiens*), and so on and so forth. A similar process can be used for a subject-to-object transition. In addition, the attribute query resolver can also use both types of transition in conjunction.

At operation 616, the identified triples are scored. How each triple was identified (e.g., keyword match as at operation 606, a related term as at operation 610, or a transition clause as at operation 614) can be associated with a query relevance. For example, a triple identified by a keyword match may be more relevant than a triple identified by a related term because of the exact match. In an embodiment, the relevance decreases as follows: triples that directly matched triples that matched the synonym, triples that match the thesaurus equivalence, triples that match the hypernyms, triples identified by using transition clauses. Each relevance can be associated with a score. As such, the attribute query resolver can score each identified triple based on a corresponding score and can rank the identified triples based on the resulting scores.

As further illustrated at operation 618, when the query includes multiple keywords, the operations 606-616 may be performed for each keyword of the query. In addition, a frequency of keyword matches is identified for each found triple. This frequency can be used to further score the triples. Generally, a frequency associated with a triple represents how often that keyword was identified across the plurality of keywords (e.g., frequency of a triple=(number of times the triple is found)/(total number of keywords)). In other words, the frequency represents the number of keyword queries that the triple appeared in.

For example, consider a query for "fast red cars." The attribute query resolver would submit three queries (one for "fast," one for "red," and one for "car"). Also assume that the query result returns five triples, where "fast" is found in triples A, B, and C, "red" is found in triples B, D, and E and "car" is found in triples B, C, and D. Accordingly, triple A appears once. Thus, the frequency of triple A across the three keywords is 1/3. Similarly, triple B appears three times and, thus, its frequency is 3/3. Triple C appears twice and its frequency is 2/3. Triple D appears twice and its frequency is 2/3. Triple E appears once and its frequency is 1/3.

At operation 620, a query result is returned. For example, the attribute query resolver would provide a list of all of the identified triples. The triples in this list can be ranked according to the corresponding score.

Figure 7:
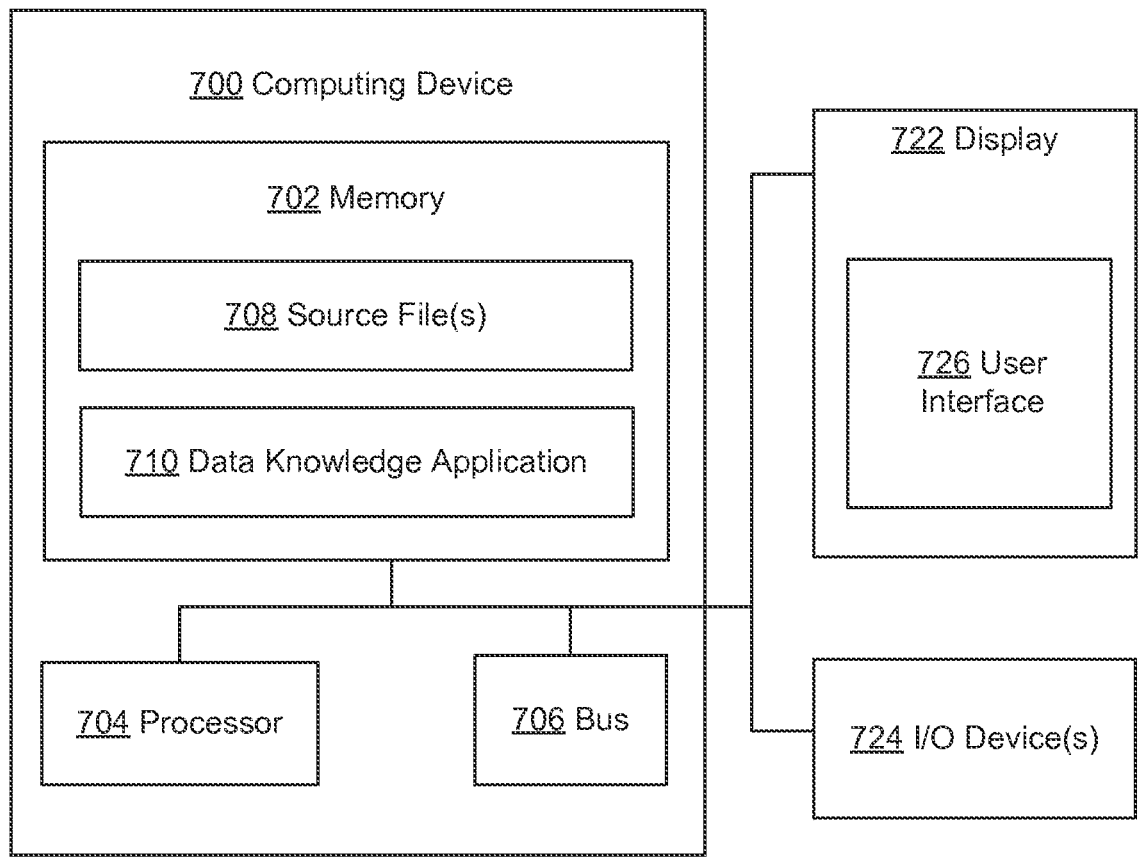
FIG. 7 illustrates an example computing device for organizing information to be searched, according to certain embodiments of the present invention.

Turning to FIG. 7, that figure illustrates an example computing device 700 that can be configured to implement a data knowledge system, described herein above. The computing device 700 can for example, access information sources, receive and analyze content, generate and organize triples and entity and mention dictionaries based on the analysis, and facilitate queries using the triples and the dictionaries. To do so, the computing device 700 can store the various modules of the data knowledge system, such as a categorizer, a triple extractor, an entity/mention extractor, and an attribute query resolver. These modules may be separate or may be integrated in a single module. In addition, the computing device 700 can store locally or remotely on a storage device the resulting knowledge dataset any other data store (e.g., WordNet database, thesauri, etc.) and/or have access to storage.

As used herein, the term "computing device" refers to any computing or other electronic equipment that executes instructions and includes any type of processor-based equipment that operates an operating system or otherwise executes instructions. A computing device will typically include a processor that executes program instructions and may include external or internal components such as a mouse, a CD-ROM, DVD, a keyboard, a display, or other input or output equipment. The example computing device 700 can be used as special purpose computing devices to provide specific functionality offered by hosted applications and by the interaction between these hosted applications. As an example, the computing device 700 is shown with a display 722 and various input/output devices 724. An example input/output device 724 includes a receiver or a network interface for receiving information, such as source file, content, or other type of data, from another computing device in a peer-to-peer configuration or over a network. A bus, such as bus 706 and bus 136, will typically be included in the computing device 700 as well.

In an embodiment, to implement a data knowledge system, the computing device 700 includes a data knowledge application 710. This application may implement the various modules, functions, features, and operations described herein above. As used herein, the term "application" refers to any program instructions or other functional components that execute on a computing device. An application may reside in the memory of a computing device that executes the application. As is known to one of skill in the art, such applications may reside in any suitable computer-readable medium and execute on any suitable processor. For example, as shown the computing device 700 has a computer-readable medium such as memory 702 coupled to a processor 704 that executes computer-executable program instructions and/or accesses stored information. The processor 704 may include a microprocessor, an ASIC, a state machine, or other processor, and can be any of a number of computer processors. Such processors include, or may be in communication with, a computer-readable medium which stores instructions that, when executed by the processor, cause the processor to perform the operations described herein.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The data knowledge application 710 can integrate the modules of the data knowledge system described above. As such, the data knowledge application 710 analyzes source files 708 to generate, update, and query the knowledge dataset. In an embodiment, the source files 708 and/or the knowledge dataset are stored in the memory 702 of the computing device 700.

To facilitate interactions with a user, the data knowledge application 710 or another application stored in the memory 702 may support a user interface 726. The user interface can be displayed to the user on the display 722 connected to the computing device 700. By operating the I/O devices 724 (e.g., a keyboard and a mouse), the user interacts with the data knowledge application 710 to generate, update, or query the knowledge dataset.

Turning to FIGS. 8-10, different knowledge models are illustrated. These models can be generated from triples stored in a knowledge dataset and can represent general or more constrained taxonomies for storing and discovering entities and relationships between entities. FIG. 8 illustrates an example graph model generated based on natural language input. FIG. 9 illustrates an example list generated based on tabular input. FIG. 10 illustrates an example logical model generated based on database input.

As illustrated in FIG. 8, an example natural language text 802 is received from a document and inputted to a data knowledge system. The data knowledge system processes this input through a sentence segmenter, a tokenizer, a Part-of-Speech tagger, and a Noun/Verb/Adjective Expression tagger to detect and tag the words in the input as illustrated in table 804. From these words, the data knowledge system and generates one or more triples 806 having a (S,P,O) format. The data knowledge system assembles the one or more triples 806 into a concise graph structure 808 to represent the content of document. This graph structure 808 can be accessible to discover the names of entities (e.g., "website") and the names of relationships (e.g., "is a"), and a specific set of triples relevant to a question.

As illustrated in FIG. 9, an example table 902 is received from, for example, a webpage and may represent semi-structured data. The table 902 is inputted to a data knowledge system. The data knowledge system generates two types of triples. The triples 904 represent (S,P,O) triples generated from the actual text found in the table. In comparison, the triples 906 represent (S,P,O) triples generated from the actual relationship in the table (e.g., from the cells in relation to the columns). The data knowledge system stores the triples 906 and 908 as a list.

As illustrated in FIG. 10, an example database table 1002 is received from an analytics database stored in a knowledge dataset and may represent structured data. The database table 1002 is inputted to a data knowledge system. The data knowledge system performs different types of operations. For example, the data knowledge system performs a clustering operation to determine the comment prefix comment and then performs (S,P,O) triple extraction to extract specific annotations for each attribute.

The data knowledge system aggregates the information into a logical knowledge model 1004. As illustrated, domain specific information is derived from the source annotations (structured, semi-structured, or unstructured.) Additionally, any special semantic linkage mechanisms such as referential integrity constraints for, for example, relational databases are either derived from the underlying relational schema or are provided as an explicit annotation or documentation item. An example annotation construct includes: JOINKEY (K[1], K[2], . . . K[i], K[N]), where K[i] is a FK or PK reference in a related table. This annotation construct is used to designate all potential JOINS for this domain. The JOINKEY( ) definitions can be derived by observing usage patterns.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method for creating a dataset to facilitate natural language searching of data from a plurality of different source files, the computer-implemented method comprising:
    identifying, by a processor, different triple extraction techniques corresponding to source files of different types, each triple extraction technique specific to a type of a source file and associated with a set of rules specific to the type of the source file;
    extracting, by the processor, triples from each source file by performing operations comprising:
        detecting the type of the source file,
        applying, to the source file, the set of rules of the triple extraction technique specific to the type of the source file, and
        identifying, for each triple from the source file and based on the application of the set of rules, a natural language phrase as a subject, another natural language phrase as an object, and an association between the natural language phrase and the other natural language phrase as a predicate, wherein the triple comprises elements including the subject, the object, and the association and has a format common to the different types of the source files;
    generating, by the processor, an entity dictionary based on the triples, wherein the entity dictionary stores a first association indicating that an element included in a first natural language phrase from a first triple is also included in a second natural language phrase from a second triple, wherein the second natural language phrase is different from the first natural language phrase;
    generating, by the processor, a mention dictionary based on the triples, wherein the mention dictionary stores a second single association indicating that the first natural language phrase and the second natural language phrase are objects in the first triple and the second triple, respectively, wherein the mention dictionary is stored separately from the entity dictionary;
    storing, by the processor, the triples, the entity dictionary, and the mention dictionary in the dataset; and
    generating, by the processor in response to a user query, a query result based on the triples, the entity dictionary, and the mention dictionary.

2. The computer-implemented method of claim 1, wherein extracting the triple from the respective source file comprises:
    detecting that the source file stores data in one or more of: a structured data format, a semi-structured data format, or an unstructured data format;
    if the data is stored in the structured data format or the semi-structured data format, identifying a structure storing natural language phrases and determining a third association to be stored as the predicate of the triple based on the structure; and
    if the data is stored in the unstructured data format, identifying one or more words from the natural language phrases and determining a fourth association to be stored as the predicate of the triple by applying a set of rules specifying relationships between the natural language phrases based on word type.

3. The computer-implemented method of claim 1, further comprising:
    parsing the user query to identify a natural language phrase of the user query;
    identifying a third triple of the dataset by matching the natural language phrase of the user query with the identified third triple's subject or object;
    identifying a fourth triple of the dataset based on the identified third triple's subject or object matching the identified fourth triple's subject or object; and
    returning the query result comprising data from the source file based on the identified third triple and the identified fourth triple.

4. The computer-implemented method of claim 1, wherein the type of the source file indicates that the source file comprises unstructured data, and wherein a particular triple extraction technique specific to the unstructured data comprises: generating a string, identifying words and word types from the string, generating natural language phrases from the words, applying a set of rules specifying relationships between the natural language phrases based on the word types, and generating one or more of the triples based on the applied set of rules.

5. The computer-implemented method of claim 1, wherein the source file comprises a text string, wherein extracting the triples comprises:
- identifying words and corresponding word types from the text string;
- generating natural language phrases based on proximities between the words; and
- applying one or more rules to the first natural language phrase and the second natural language phrase to generate a particular triple, the one or more rules associated with one or more patterns and being applied based on matching the one or more patterns to the word types, the one or more rules specifying relationships between two or more natural language phrases.

6. The computer-implemented method of claim 1, further comprising updating the entity dictionary based on the first natural language phrase, wherein the entity dictionary associates subjects and objects with natural language phrases in which each respective subject and object participates, wherein the updating comprises:
- identifying a word from the subject of the triple;
- updating a key from a key-value pair of the entity dictionary with the word; and
- updating a value of the key-value pair with the first natural language phrase.

7. The computer-implemented method of claim 1, further comprising updating the mention dictionary based on the first natural language phrase, wherein the mention dictionary associates natural language phrases with one or more of the triples in which each natural language phrase participates, wherein the updating comprises:
- updating a key from a key-value pair of the mention dictionary with the first natural language phrase; and
- updating a value of the key-value pair with an identifier of a corresponding triple.

8. The computer-implemented method of claim 1, wherein the source file comprises text defined in a hierarchical structure, wherein extracting the triples comprises:
- extracting words from the text;
- identifying types of the words, the types of the words comprising a noun, a verb, an adjective, an adverb, and a preposition;
- generating a third triple based on the words and the types of the words; and
- generating a fourth triple based on the hierarchical structure, wherein a subject and an object of the fourth triple correspond to edges of the hierarchical structure, and wherein a predicate of the fourth triple corresponds to a relationship between theedges.

9. A system comprising:
a processor;
a memory communicatively coupled to the processor and bearing instructions that, upon execution by the processor, cause the system to at least perform operations comprising:
- accessing words from a source file, the words to be organized based on associations between the words;
- selecting a triple extraction technique specific to a type of the source file, the triple extraction technique selected based on the type of the source file and associated with a set of rules specific to the type of the source file;
- extracting a triple from a subset of the words based on applying the set of rules to the words, the triple comprising elements that include a subject, a predicate, and an object corresponding to the subset of the words, the set of rules applicable to the subset of the words based on a pattern of word types;
- updating, based on parsing entities of the triple, a structure configured to store an association between an entity from the triple, a first phrase from the triple, and a second phrase from a second triple, the entity comprising one or more words from the subject or the object, the first phrase comprising the subject or the object from the triple, and the association indicating that the entity is included in the first phrase and the second phrase;
- updating, based on a determination that the first phrase contains at least one of the entities of the triple and that the second phrase contains the at least one of the entities in the second triple, another structure configured to store another association between the first phrase and the triple and the second phrase and the second triple; and
- storing the triple, the structure, and the other structure in a dataset, wherein a natural language search result is available based on the triple the structure, and the other structure stored in the dataset.

10. The system of claim 9, wherein extracting the triple comprises:
- annotating each word of the subset of the words with a corresponding word type;
- identifying phrase expressions formed by proximate words; and
- applying the set of rules to the words and the phrase expressions based on the pattern of the word types.

11. The system of claim 9, wherein extracting the triple from the subset of the words comprises:
- detecting the pattern of the word types based on annotations of the subset of the words, the annotations comprising the word types;
- matching the pattern of the word types to one or more rules from the set of rules, the one or more rules specifying an association between two or more words based on the pattern of the word types; and
- applying the one or more rules to the subset of the words to generate the triple based on the specified association between the two or more words.

12. The system of claim 9, wherein accessing the words from the source file comprises identifying a string of the words and a structure associated with the source file, and wherein extracting the triple comprises:
- extracting a third triple from the string of the words based on a first subset of the set of rules applicable to the string of the words, and
- extracting a fourth triple from the structure associated with the source file based on a second subset of the set of rules applicable to the structure associated with the source file.

13. A non-transitory computer-readable storage medium storing instructions that, when executed on a computing device, configure the computing device to perform operations comprising:
- detecting words and corresponding word types from a source;
- selecting a triple extraction technique specific to a type of the source, the triple extraction technique selected based on the type of the source and associated with a set of rules specific to the type of the source;
- generating a triple based on applying the set of rules to the words, the set of rules applied based on a pattern of the word types and providing an association between at least two words, the triple comprising the at least two words;

updating, based on parsing entities of the triple, a first structure configured to store a first association between a word from the triple and a first phrase from the triple and between the word and a second phrase from a second triple, the first phrase formed based on a proximity of the word with another word, an entity of the triple comprising one or more words included in the triple;

updating, based on a determination that the first phrase contains at least one of the entities of the triple, a second structure configured to store a second association between the first phrase and the triple and between the second phrase and the second triple; and storing the triple, the first structure, and the second structure in a dataset, wherein a natural language search result is available based on the triple the first structure, and the second structure stored in the dataset.

14. The non-transitory computer-readable storage medium of claim 13, wherein the first structure is further configured to store first associations between words from triples and phrases, wherein the second structure is further configured to store second associations between the phrases and the triples, wherein the triples are stored in the dataset, wherein the dataset is configured to facilitate querying the triples, wherein querying the triples comprises:

receiving a query comprising a keyword;

identifying a subset of the phrases based on matching the keyword to the words from the first structure;

identifying a subset of the triples from the second structure based on the second associations between the subset of the phrases and the subset of the triples;

replacing the keyword with one or more of a synonym, a hypernym, or a thesaurus equivalent word;

identifying additional subsets of the phrases from the first structure and additional subsets of the triples from the second structure based on the replacing; and scoring the subset of the triples and the additional subsets of the triples based on whether the keyword was used or whether the keyword was replaced to identify the triples.

15. The non-transitory computer-readable storage medium of claim 13, wherein the first structure is further configured to store first associations between words from triples and phrases, wherein the second structure is further configured to store second associations between the phrases and the triples, wherein the triples are stored in the dataset, wherein the dataset is configured to facilitate querying the triples, wherein querying the triples comprises:

receiving a query comprising a plurality of keywords;

identifying, for each keyword, a subset of the phrases and a subset of the triples based on the first structure and the second structure;

determining, for each triple from the identified subset of the triples, a frequency of identifying the triple based the plurality of keywords; and scoring the identified subset of the triples based on corresponding frequencies.

16. The non-transitory computer-readable storage medium of claim 13, wherein the triple comprises a subject, a predicate, and an object, wherein the dataset is configured to facilitate querying triples, wherein querying the triples comprises:

receiving a query comprising a keyword;

identifying the first phrase and the triple from the first structure and the second structure based on matching the keyword; and identifying another triple from the triples based on matching the subject of the triple with another object of the other triple or based on matching the object of the triple with another subject of the other triple.

17. The computer-implemented method of claim 1, wherein:

generating the entity dictionary comprises: adding an element of a particular triple as a key of a key-value pair of the entity dictionary and adding a phrase containing the element of the particular triple is to a value of the key-value pair of the entity dictionary; and generating the mention dictionary comprises adding a particular phrase as a key of a key-value pair of the mention dictionary and adding an identifier of an additional particular triple associated with the particular phrase to a value of the key-value pair of the mention dictionary.

18. The computer-implemented method of claim 1, wherein extracting the operations to extract the triples further comprise generating stratified data from the source file based on the type of the source file, and wherein the set of rules are applied to the stratified data.

19. The computer-implemented method of claim 1, wherein the entity dictionary identifies that the element is included in the first natural language phrase and the second natural language phrase by storing a list of the element, the first natural language phrase, and the second natural language phrase without identifying the first triple and the second triple in the list.

20. The computer-implemented method of claim 1, wherein the mention dictionary identifies that the first natural language phrase and the second natural language phrase are objects by listing the first natural language phrase and the second natural language phrase in a group for objects, wherein the group comprises identifiers for the first triple and the second triple.

* * * * *